Patented July 1, 1924.

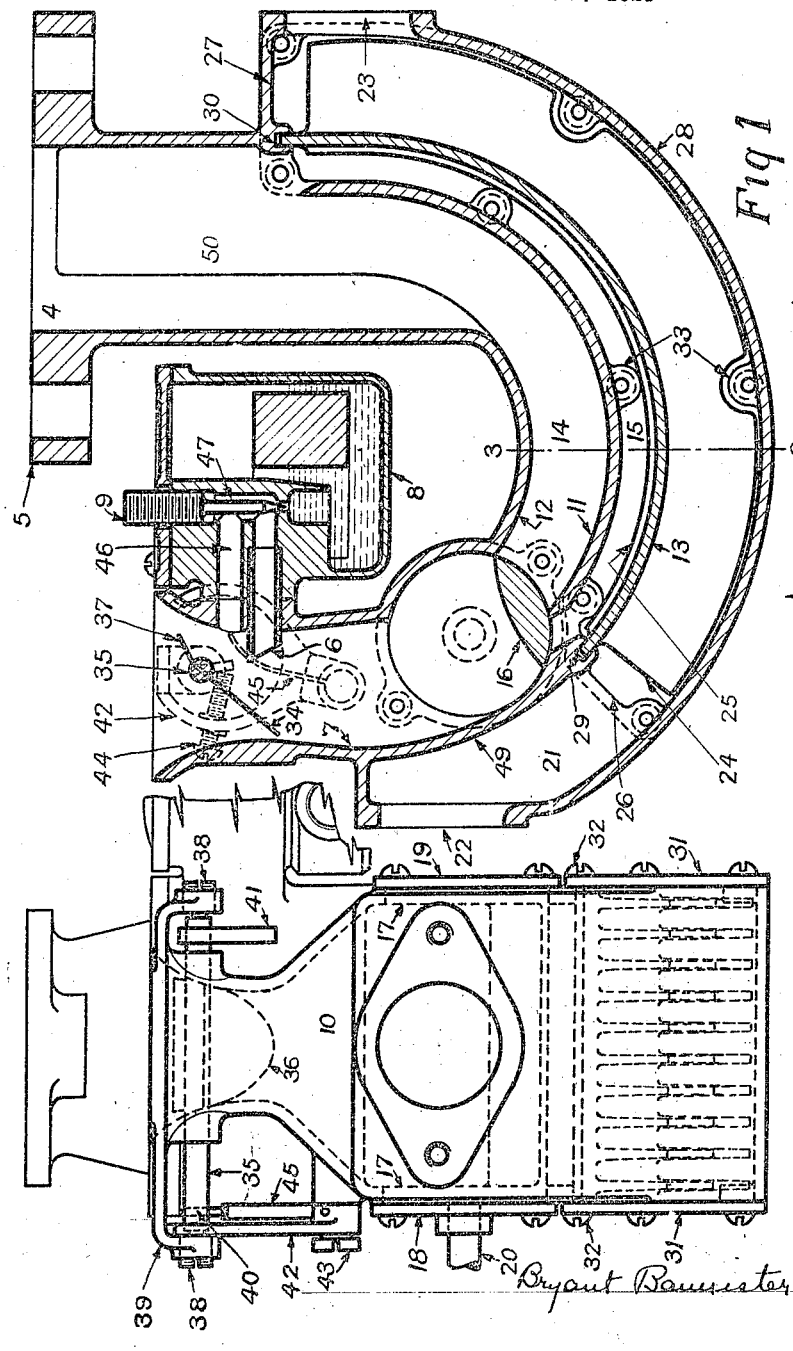
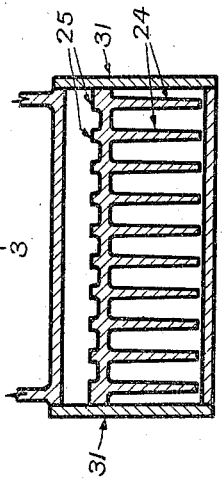
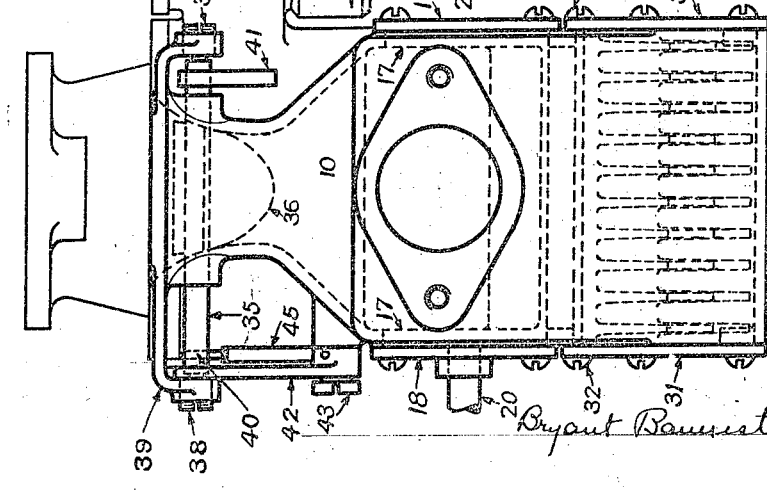

1,499,800

UNITED STATES PATENT OFFICE.

BRYANT BANNISTER, OF PITTSBURGH, PENNSYLVANIA, ASSIGNOR TO BANNISTER MOTOR APPLIANCE COMPANY, A CORPORATION OF PENNSYLVANIA.

CARBURETOR.

Application filed November 12, 1921. Serial No. 514,571.

*To all whom it may concern:*

Be it known that I, BRYANT BANNISTER, a citizen of the United States, and a resident of Pittsburgh, in the county of Allegheny and the State of Pennsylvania, have made a new and useful Invention in Carburetors, of which the following is a specification.

This invention relates to carburetor or combustible mixture or charge forming devices for internal combustion engines.

The present practice of making commercial gasoline by mixing highly volatile hydro-carbon fractions with heavier fractions such as naphtha, distillate and kerosene makes it desirable that some means be provided for transforming the mixture of such complex liquid and air into a mixture which may be readily and thoroughly consumed in an internal combustion engine operating under varying load conditions and an object of this invention is to provide means for thoroughly vaporizing the heavier components of such liquid fuel without materially raising the temperature of the lighter components thereof in order to obtain a combustible mixture of maximum density consistent with complete and rapid combustion under varying load conditions.

In utilizing hydro-carbon fuels, composed in part of heavier not readily vaporizable fractions, it has been found that in order to obtain smokeless operation, the mixture should enter the engine cylinders at relatively high temperatures when idling and when running at low loads and at much lower temperatures when operating under heavy loads. This also prevails for obtaining maximum efficiency and maximum output of a given engine.

A further object of this invention, therefore, is to provide a carburetor or charge forming device for fulfilling the above requirements.

Realizing that a mixture of present-day commercial gasoline and air is necessarily a wet mixture, and that the less rapidly vaporizable components of the same may be centrifugally separated from the main body of the mixture, a further object of this invention is to provide a simple carburetor utilizing centrifugal selective separation whereby the heavier or wet portions may be heated and rendered readily inflammable without materially increasing the temperature of the mixture stream as a whole thus insuring mixture of maximum density consistent with rapid and complete combustion.

A still further object is to provide a carburetor in which the mixture under certain varying conditions is automatically enriched or impoverished.

A still further and more limited object is to provide means in a carburetor, adapted to be used on a motor vehicle, for automatically enriching the mixture as the vehicle ascends a grade, and for automatically impoverishing the mixture as the vehicle descends a grade.

The above as well as other objects I attain in the device described in the specification and illustrated in the drawings accompanying and forming a part of this application.

In the drawings Fig. 1 is a view in vertical section through the device. Fig. 2 is an end view in elevation looking toward the inlet end of the device (portions of the float chamber being broken away), and Fig. 3 is a cross sectional view taken on line 3—3 of Fig. 1.

The carburetor or mixture forming device comprises:—first, an inlet portion in which the proportioning of liquid fuel and air takes place and in which the preliminary atomizing or pulverizing of the liquid fuel and its mechanical admixture with the air occurs,—second, a combined heating and vaporizing portion in which the mixture is selectively heated and in which the heavier components thereof tend to traverse one path where they are heated and vaporized, while the lighter components tend to traverse another path, in which their temperature is not materially raised,—third, an outlet portion in which the heated and unheated components of the mixture are reunited and compacted in a homogeneous stream.

The outlet 4 of the device is flanged at 5 for attachment to the engine inlet manifold. A fuel nozzle 6 located within the air inlet 7 is supplied with liquid fuel from a constant level float chamber 8, and the flow of liquid fuel from the float chamber is controlled by means of needle valve 9.

The inlet portion adjacent fuel nozzle 6 is formed in the nature of a Venturi choke tube, and the fuel nozzle enters the throat or constricted portion of the tube. Below the throat the mixture channel widens out as shown at 10 (Fig. 2), and the passage through the device from this point to the outlet 4 is substantially rectangular in cross section in the main and of arcuate form.

A baffle or partition 11 concentrically arranged with relation to the upper and lower walls 12 and 13, respectively, of the arcuate passage divides the passage into two channels 14 and 15.

A valve 16 formed somewhat in the manner of a Corliss valve with circular end plates 17—17 is rotatively mounted within circular openings formed in the side walls of the device, and is confined in place by end plates 18 and 19.

A valve spindle 20 projects through end plate 18 and by means of suitable mechanism is adapted to be rotated either manually or by a governor.

A heater chamber 21 preferably of arcuate form and having an inlet 22 and an outlet 23 encircles the lower or outer arcuate wall of the mixture passage.

The outer wall 13 of outer channel 15 of the mixture passage 14 is provided with a number of heat absorbing fins 24 which extend from end to end of the heater and across the same from top to bottom. A number of heat radiating ribs 25 project from wall 13 a slight distance into channel 15 and extend from one end to the other thereof.

For the purpose of manufacture, both sides of the device are open from point 26 to point 27, and from partition or baffle 11 to the outer wall 28 of the heater so that the heat interchange element made up of arcuate wall 13, heat absorbing fins 24, and heat radiating ribs 25 may be slid sidewise into place in grooves or slots 29 and 30 formed for that purpose in the main casting. The sides of the channel 15 and the sides of the heater are closed by side plates 31—31 held in place by screws 32 which are threaded into suitable bosses 33 on the main casting.

A mixture modifier formed in the nature of a thin plate 34 is carried by a small shaft 35 which passes through openings formed for that purpose in the side walls above the throat of the Venturi choke tube. The lower end of the plate is shaped, as shown at 36, to conform to the adjacent wall of Venturi choke tube, while the upper end 37 is preferably bent at an angle to the main portion of the plate, and is formed straight across from side to side.

Shaft or stem 35 is mounted for rotation on bearing screws 38 carried by a yoke 39 formed as a part of the main casting. Stem 35 near one end carries a stop pin 40 and at the other a weight 41.

A yoke 42 oscillatively mounted on a stud screw 43 threaded into a boss on the main casting, on one arm carries an idling adjustment screw 44 and at its center carries a light flat spring 45. The yoke by means of suitable mechanism is adapted to be manually manipulated. When in the position shown in Fig. 1 the yoke abuts against stop pin 40 and by means of adjusting screw 44, the idling position of modifier 34 may be secured. When the yoke is swung to the opposite position, spring 45 will be in contact with stop pin 40 and will yieldingly hold modifier plate 34 in position so that its lower end will contact with the wall of the Venturi choke tube. The mechanism for oscillating the yoke will preferably be such that the yoke will be locked at one or the other limits of its movement. A duct or channel 46 extends from the Venturi choke tube to a channel 47 which surrounds needle valve 9 and which communicates with fuel nozzle 6.

Assume that the carburetor or mixture forming device is connected up to an internal combustion engine and a suitable source of liquid fuel supply and that heater 21 is connected so as to receive exhaust gases from the engine. Before starting the engine, yoke 42 will preferably be swung to the opposite position from that shown in Fig. 1 and throttle valve 16 will be slightly cracked. With the device so set, the mixture will be abnormally rich, since modifier 34 by means of spring 45 will be held in what may be termed closed or rich position, that is, with its lower end in contact with the throat wall. When in closed position, the modifier tends to create an abnormal condition in the throat of the Venturi choke tube, a condition in which the pressure at the outlet of fuel nozzle 6 is subnormal, thereby effecting an over-rich mixture which is desirable for starting.

Channel or port 46 enters the Venturi choke tube at a point above the fuel nozzle, in other words at a point where the pressure, during the operation of the engine, will be slightly greater than the pressure at the outlet of the fuel nozzle, air, therefore, will flow through port in channel 46 to chamber 47 surrounding needle valve 9 and back to the Venturi choke tube through the fuel nozzle. This tends to break up or atomize the liquid fuel and thus facilitates vaporization.

The mixture, or at least a portion thereof, before it passes throttle valve 16 will contact with heated plate 49 which forms a dividing wall between one portion of the arcuate mixture passage and the heater, but the unvaporized portions of the liquid fuel issuing from nozzle 6 during idling and light loads will fall by gravity onto valve 16. During idling and light loads, on account of the slight opening of the valve, the liquid fuel because of the tendency of the mixture flowing through the valve to wire-draw, will be pulverized or atomized and this pulverized liquid in passing through the heated channel 15 will be converted into a readily inflammable vapor.

During idling and light as well as intermediate loads, all of the mixture will pass through heating channel 15 and during heavy loads and at high speed when the throttle is wide open, the lighter components of the mixture will traverse passage 14 while the heavier components, on account of the arcuate form of the mixture passage, will tend to traverse channel 15. During periods when the throttle is open to such a position that there will be a flow through both channels 14 and 15, the streams traversing these will reunite in chamber 50 and, since the mixture passage above this chamber is contracted to form the circular outlet 4 of the device, the reunited streams will be compacted into one homogeneous mixture stream. Since during heavy loads the heavier components only of the mixture are heated, the compacted stream issuing from the outlet 4 will be of the maximum density consistent with rapid and complete combustion in the engine cylinders.

With yoke 42 in running position (the position shown in Fig. 1) weight 41 on account of its form and position tends to hold modifier plate 34 in the position shown in Fig. 1. It will be so arranged with relation to the modifier however, that when any change occurs in the position of the carburetor from normal or horizontal position, the weight will tend to swing the modifier.

Spring 45, during starting, (the yoke then being in the opposite position from that shown in Fig. 1), tends to hold the lower end of the modifier in contact with the adjacent wall of the Venturi choke tube thereby causing an abnormal depression at the outlet of fuel nozzle 6, resulting in an abnormally rich mixture which is desirable for starting. The weight during normal running, tends to hold the modifier in the position shown in Fig. 1, but allows the modifier to swing to inoperative position at times of maximum air velocity through the inlet. During times of decreased air velocity the modifier comes into play and automatically changes or modifies the depression existing at the outlet of the fuel nozzle, increasing the depression as the load on the engine decreases and decreasing the depression as the load increases.

The heater will be connected up to the exhaust manifold of the engine so that the required amount of exhaust gases for satisfactory heating will flow in through inlet 22 and pass out through outlet 23, and, if desired, a valve may be placed either in the line leading to the heater or the line leading therefrom, so that the temperature of the heater may be regulated.

While I have illustrated and described a single embodiment of my invention, it will be apparent that various changes, modifications, substitutions, additions and omissions may be made in the device illustrated without departing from the spirit and scope of my invention, as set forth by the appended claims.

I claim:

1. In a combustible mixture forming device for internal combustion engines, means dividing the mixture traversing the device into two streams of different densities, means for heating the denser of said streams to a higher temperature than the other stream and means for allocating the mixture to said streams.

2. In a combustible mixture forming device for internal combustion engines, two mixture traversing passages of such relative location that the heavier components of the mixture traversing them tend to enter one passage in preference to the other, means for heating the passage which the heavier components so tend to enter to a higher temperature than the other passage, and a valve for apportioning the mixture between said passages.

3. In a combustible mixture forming device for internal combustion engines, two mixture traversing passages of such form and relative location that the heavier components of the mixture traversing them tend to enter one passage in preference to the other, means for heating the passage which the heavier components so tend to enter to a higher temperature than the other passage, and means located immediately adjacent the entrance to said passages for apportioning the mixture between said passages.

4. In a combustible mixture forming device for internal combustion engines, two mixture traversing passages of such relative location that the heavier components of the mixture traversing them tend to enter one passage in preference to the other, means for heating the passage which the heavier components so tend to enter to a higher temperature than the other passage, and means for so controlling said passages that one remains entirely closed until the other is wide open and the one last to open is entirely closed before the other begins to close.

5. In a combustible mixture forming device for internal combustion engines, two mixture traversing passages of such form and relative location that the heavier components of the mixture traversing them tend to enter one passage in preference to the other, means for heating the passage which the heavier components so tend to enter to a higher temperature than the other passage, and means located immediately adjacent the entrance to said passages for so controlling said passages that one remains entirely closed until the other is wide open and the one last to open is entirely closed before the other begins to close.

6. In a combustible mixture forming device for internal combustion engines, an air inlet, a mixture outlet, a liquid fuel nozzle adjacent said inlet, two mixture traversing passages intermediate said inlet and outlet and of such form and relative location that the heavier components of the mixture traversing the device tend to enter one passage in preference to the other, means for heating the passage which the heavier components so tend to enter to a higher temperature than the other passage, and a valve located immediately adjacent the entrance to said passages for so controlling said passages that one remains entirely closed until the other is wide open and the one last to open is entirely closed before the other begins to close.

7. In a combustible mixture forming device for internal combustion engines, an air inlet, a mixture outlet, a liquid fuel nozzle adjacent said inlet, two mixture traversing passages intermediate said inlet and outlet and of such relative location that the heavier components of the mixture traversing the device tend to enter one passage in preference to the other, means for heating the passaage which the heavier components so tend to enter to a higher temperature than the other passage, and a valve for so controlling said passages that one remains entirely closed until the other is wide open and the one last to open is entirely closed before the other begins to close.

8. In a combustible mixture forming device for internal combustion engines, an air inlet, a mixture outlet, a fuel nozzle adjacent said inlet, means dividing a portion of the interior of the device into two passages, a heat interchanger associated with one of said passages and a valve located at the inlet to said passages for controlling the flow of fluid therethrough and arranged so that the vaporized liquid fuel from said nozzle will fall thereon by gravity.

9. In a combustible mixture forming device for internal combustion engines, fuel feeding means, means tending to centrifugally separate the unvaporized from the vaporized portions of the fuel, means for heating the unvaporized portions, a valve located at the entrance to said heating means and constructed so as to wire-draw and atomize the fluid flowing therethrough during light loads on the engine to which the device is attached.

10. In a combustible mixture forming device for internal combustion engines, two mixture-traversing passages so constructed and arranged that the heavier components of the mixture will tend to flow through one passage while the lighter components will tend to flow through the other, means for heating the passage through which the heavier components tend to flow and a Corliss type valve located at the inlets to said passage.

11. In a carburetor, a throttle valve, an air inlet above said throttle, a mixture outlet beyond said throttle valve, a fuel nozzle adjacent said inlet, a divided arcuate passage between said throttle valve and said outlet and a heat interchanger associated with one of the divisions of said passage.

In testimony whereof, I have hereunto subscribed my name this 7th day of November, 1921.

BRYANT BANNISTER.